United States Patent [19]

Cronkright et al.

[11] Patent Number: 4,579,727

[45] Date of Patent: Apr. 1, 1986

[54] OXIDATIVE REMOVAL OF HYDROGEN SULFIDE FROM GAS STREAMS

[75] Inventors: Walter A. Cronkright; Maury I. Schlossman, both of Houston; Aaage Solbakken, Montgomery; Christiaan P. van Dijk, Houston, all of Tex.

[73] Assignee: The M. W. Kellogg Company, Houston, Tex.

[21] Appl. No.: 678,138

[22] Filed: Dec. 4, 1984

[51] Int. Cl.$^4$ ............... B01D 53/34; C01B 17/05; C01B 17/64
[52] U.S. Cl. .................. 423/573 R; 423/221; 423/514
[58] Field of Search .............. 423/221, 514, 573 R

[56] References Cited

U.S. PATENT DOCUMENTS

| | | | |
|---|---|---|---|
| 1,639,905 | 8/1927 | Sperr, Jr. et al. | 423/514 |
| 1,832,325 | 11/1931 | Rosenstein | 423/221 |
| 1,937,196 | 3/1931 | Gollmar | 423/222 |
| 2,152,454 | 3/1939 | Baehr | 423/221 |
| 2,729,543 | 12/1950 | Keller | 423/243 |
| 3,536,618 | 9/1968 | Urban et al. | 210/50 |
| 3,773,662 | 11/1973 | Urban | 210/50 |
| 4,243,648 | 1/1981 | Fenton | 423/573 R |
| 4,263,271 | 4/1981 | Klaus-Dirk Henning et al. | 423/573 G |
| 4,367,212 | 1/1983 | Castrantas | 423/573 R |
| 4,432,962 | 2/1984 | Gowdy et al. | 423/573 R |
| 4,434,146 | 2/1984 | Weber | 423/224 |
| 4,496,371 | 1/1985 | Urban et al. | 423/221 |

OTHER PUBLICATIONS

Chemical Abstracts, vol. 84, No. 79140m 1976.
The Encyclopedia of Chemistry, 3rd Ed. Ed. by Clifford A. Hampel, Gessner G. Hewley, Van Nostrand Reinhold Co. 1973, pp. 166–167.

Primary Examiner—John Doll
Assistant Examiner—Jeffrey E. Russel

[57] ABSTRACT

A process for recovering elemental sulfur from a hydrogen sulfide containing gas stream by reacting the hydrogen sulfide in the gas stream with a buffered aqueous solution enriched in thiosulfate ions at an initial pH between about 4.5 and 6.5 for residence time to sufficiently react a portion of the hydrogen sulfide to elemental sulfur. The elemental sulfur is then removed and the solution now lean in thiosulfate ions is regenerated by the oxidation of the remaining hydrogen sulfide in the gas stream to deplete the hydrogen sulfide from the gas stream and to regenerate the liquid solution for recycling to the reduction zone.

10 Claims, 2 Drawing Figures

OXIDATIVE REMOVAL OF HYDROGEN SULFIDE FROM GAS STREAMS

BACKGROUND OF THE INVENTION

This invention relates to the removal of hydrogen sulfide from gas streams by contacting the hydrogen sulfide containing gas stream with an aqueous solution containing thiosulfate ions to form elemental sulfur with the subsequent regeneration of thiosulfate ion by the oxidation of hydrogen sulfide.

Hydrogen sulfide is often present in many gas streams as a contaminant which prevents the untreated discharge of gas streams to the atmosphere or the use of components of certain gas streams for other productive purposes. Over the years many desulfurization processes have been developed in attempts to produce gas streams substantially free of hydrogen sulfide. Many of these processes are operated in a cyclical manner and employ regenerable oxidizing agents to oxidize hydrogen sulfide to elemental sulfur which is recovered and to discharge to the atmosphere or reuse the gas stream. Regeneration of the reduced oxidizing agent in an aqueous absorbing medium, after its oxidation of the hydrogen sulfide to sulfur, is typically accomplished by contacting the aqueous medium with air or oxygen gas.

Many such processes have been attempted often using a relatively expensive organic material in the solution. A common detriment attributed by those skilled in the art with many of these so-called wet desulfurization processes, particularly those involving some organic derivatives such as quinones, is the formation of thiosulfate ions as a by-product. Much effort and creativity has been directed towards the reduction or elimination of thiosulfates or polythionates present in the oxidizing liquor used to absorb the hydrogen sulfide from the gas stream. Several such attempts are described for example, in U.S. Pat. No. 4,347,212. One Patent, U.S. Pat. No. 3,773,662, describes a process for removing thiosulfates from solutions by introducing hydrogen sulfide gas into the liquid stream to decompose the polysulfide and suppress hydrolysis of elemental sulfur during cooling thus increasing the recovery of sulfur from a sulfur plant. The presence of thiosulfate was treated as an undesirable nuisance.

It has long been recognized that the polythionate or thiosulfate salt in aqueous solution will react with hydrogen sulfide to form sulfur. For instance, U.S. Pat. No. 1,832,325 teaches a process for removing hydrogen sulfide by oxidizing sodium thiosulfate to sodium tetrathionate and reacting it with hydrogen sulfide. It also discloses the use of buffering salts such as sodium bicarbonate or acid sodium phosphates to keep the hydroxide ion concentration below a value above which sodium tetrathionate would become unstable. Oxidation of the thiosulfate to tetrathionate is accomplished by the use of certain catalyst of nickel or cobalt.

U.S. Pat. No. 1,937,196 teaches the removal of hydrogen sulfide from a gas stream by the contact of a sodium carbonate solution which is later regenerated by heating and aeration. This patent teaches the use of thiosulfate salts such as sodium thiosulfate, ammonium thiosulfate, zinc thiosulfate, iron thiosulfate and the like for the absorption of sulfur dioxide wherein the thiosulfate is regenerated by contact with hydrogen sulfide. Sulfur is recovered after such contact with the thiosulfate solution having absorbed sulfur dioxide.

In U.S. Pat. No. 3,536,618 there is described a sulfur removal step wherein ammonium thiosulfate is reacted with hydrogen sulfide in a gas stream which is then decomposed to recover ammonium, hydrogen sulfide, water and elemental sulfur. The resulting aqueous stream is recycled to remove sulfide salts from a hydrocarbon product stream by a simple absorption. This process does not deal with the clean-up of a gas stream but does disclose the reaction of a thiosulfate with hydrogen sulfide to form elemental sulfur.

Hydrogen sulfide removal in the presence of an activated carbon catalyst and stoichiometric amounts of oxygen is described in U.S. Pat. No. 4,263,271. There is no liquid phase involved in the discussion with respect to this patent.

The removal of hydrogen sulfide from a gas stream by contact with a regenerable washing solution having a pH of between about 5 and 10 and containing solubilized vanadium, thiocyanate ions, a carboxylate complexing agent, one or more water soluble quinones and one or more water soluble nonquinone aromatic compounds capable of solubilizing tetravalent vanadium is described in U.S. Pat. No. 4,432,962 which issued on Feb. 21, 1984. The absorbed hydrogen sulfide is converted to elemental sulfur and after oxidative regeneration of the washing solution is separated from the regenerated solution.

U.S. Pat. No. 4,243,648 also describes a hydrogen sulfide removal and conversion method wherein a hydrogen sulfide containing gas stream is contacted with a regenerable washing solution capable of absorbing hydrogen sulfide and converting the hydrogen sulfide to hydrophobic elemental sulfur particles. After regeneration of the washing solution having a pH of between 5 and 10 which contains solubilized vanadium, thiocyanate ions, a solubilizing agent for tetravalent vanadium and a water soluble carboxylate complexing agent, the elemental sulfur form is separated. The patent describes this process as being particularly useful for removal of hydrogen sulfide from gas streams produced by the sweetening of sour natural gas, processing of ores, the destructive distillation of coal and oil shale, the gasification or liquifaction of coal, the use of geothermal fluids to generate electricity or other processes which produce hydrogen sulfide containing gases.

Notwithstanding the disclosures of the foregoing prior art, much is still to be accomplished in the removal of hydrogen sulfide from contaminated gas streams. Previously hydrogen sulfide was removable only by employing multiple unit operations such as, for example, an amine scrubber followed by a Claus unit which in turn was followed by a tail gas treatment and still sulfur was left in the gas stream. To accomplish a technical solution to the problem where removal of hydrogen sulfide and sulfur recovery is simply and efficiently accomplished the invention herein described was made. Many advantages of the present invention will become manifest in view of the following description.

SUMMARY OF THE INVENTION

The present invention accomplishes the removal of hydrogen sulfide from contaminated gas streams and the recovery of elemental sulfur by the contact of such gas stream with a buffered aqueous solution enriched in thiosulfate ions at an initial pH of from 4.5 to 6.5 at the liquid inlet of the first reaction zone for a residence time sufficient to react a portion of the hydrogen sulfide in the gas stream to elemental sulfur thereby reducing the thiosulfate to elemental sulfur. The resulting wash stream, now lean in the thiosulfate ion, is passed to a second reaction zone where it contacts the gas stream, now lean in hydrogen sulfide but fortified with at least a stoichiometric amount of oxygen such that the hydrogen sulfide remaining in the contaminated gas stream is oxidized to the thiosulfate in this second reaction zone thus enriching the solution. The now cleaned gas stream is then removed from the second reaction zone and the liquid aqueous solution enriched in thiosulfate ion is recycled to the first reaction zone to contact additional hydrogen sulfide. The initial contact of the gas stream and liquid in the second reaction zone is made at a pH of from 5.0 to 7.0.

The advantages of this invention are many. The process of the invention can be easily adapted to treat many gas streams contaminated with a wide range of hydrogen sulfide concentrations; from vent gases containing only small amounts of hydrogen sulfide to refinery effluent gases which may be substantially pure hydrogen sulfide. Hydrogen sulfide removal can be accomplished without forming noxious sulfur dioxide gases. It is particularly useful in instances wherein acid gases removed from the sweetening of natural gas containing hydrogen sulfide and carbon dioxide are treated in the process to recover the sulfur so that the carbon dioxide can then be used for enhanced oil recovery methods.

Another advantage paramount in the operation of the method of this invention is that great variations of hydrogen sulfide concentration in the contaminated gas stream being treated can be accommodated in the practice of the invention without destroying the operability thereof as will be seen from the following discussion.

The novel features of this invention which are considered as characteristic thereof are set forth in particular in the appended claims. The invention itself, however, both as to its construction and method of operation, together with the objects and advantages thereof, though not to be limited thereby, will be best understood from the following description of specific embodiments when read in connection with the accompanying drawings.

DETAILS OF THE INVENTION

Figure 1:
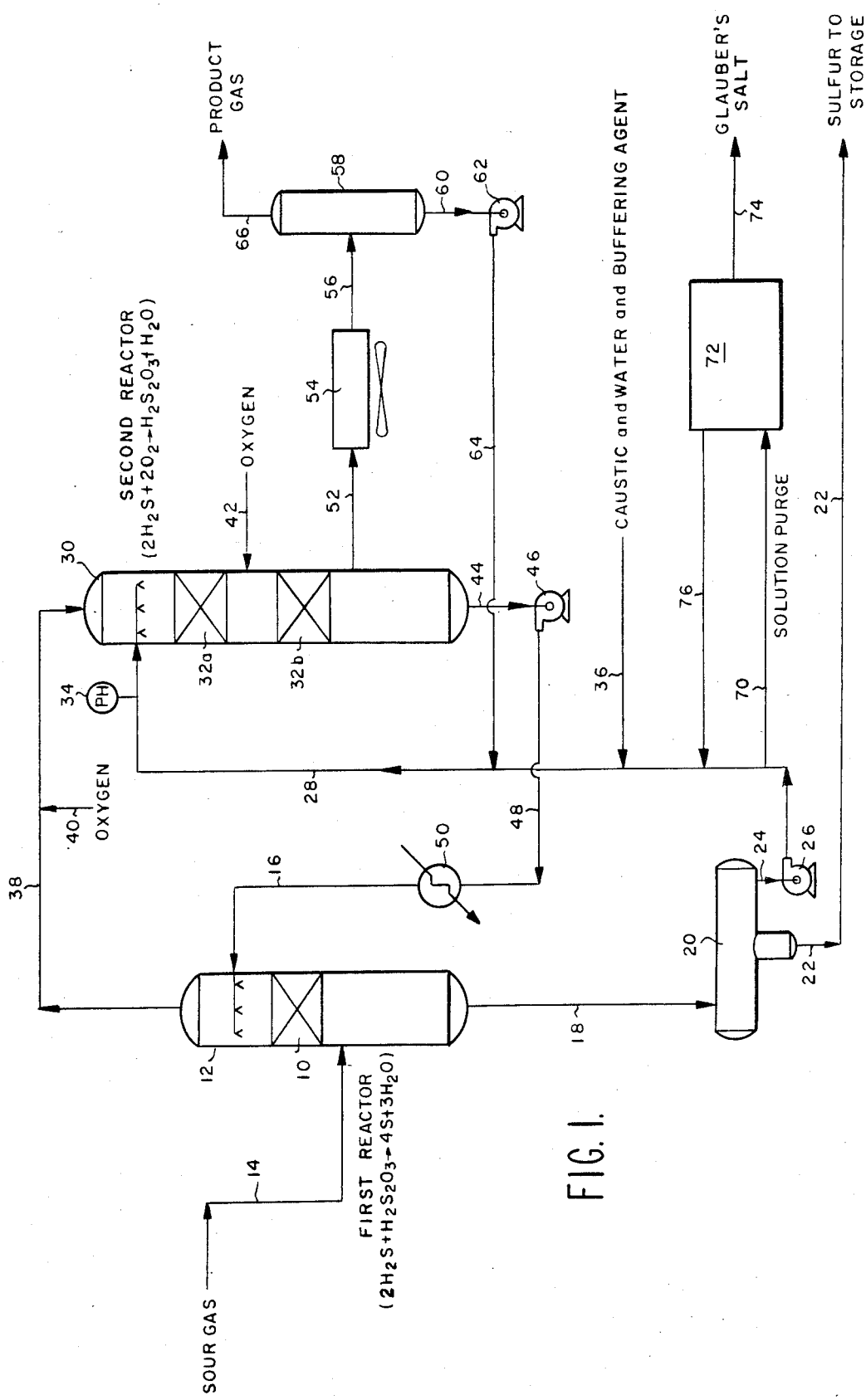
FIG. 1 is a diagram showing the process of this invention.

While the presence of thiosulfates was previously considered to be a detriment in processes of recovering elemental sulfur present as hydrogen sulfide in gas streams, it has now been discovered that the presence of thiosulfate ions in aqueous solutions can be used to the advantage of recovering hydrogen sulfide from gas streams as in the form of elemental sulfur. The process of this invention operates utilizing two reaction zones, one wherein the thiosulfate ion in the buffered aqueous solution contacts hydrogen sulfide in the gas stream reacting to form elemental sulfur, and the other where hydrogen sulfide remaining in the gas stream is oxidized to restore the thiosulfate concentration in the aqueous solution.

The reaction zones provide the location for liquid gas contact in ways known to the engineer such as, for example, bubble plate column, a back mixing reactor or the packed bed, which is preferred.

The reaction in the first reaction zone is preferably conducted at temperatures at which elemental sulfur is molten to facilitate the separation of elemental sulfur from the aqueous absorbing solution. A suitable operating pressure is maintained to reduce the vaporization of water occurring from the solution to minimize the need for water make up and chemical treatment; typically a fair minimum for operation is 6 kg/cm$^2$ for low pressure application since the partial pressure of steam at operating temperature is 5 kg/cm$^2$ and, as later stated, higher pressures of 35 kg/cm$^2$ or even greater are useful, even up over 150 kg/cm$^2$. The initial contact of the gas stream with buffered liquid aqueous solution rich in thiosulfate ions occurs at a pH in the range of 4.5 to 6.5 preferably from 5.5 to 6.0. In this pH range the reaction between the thiosulfate ion in solution and the hydrogen sulfide contaminate of the gas stream is relatively fast. The contact preferably occurs on a solid packing in the reaction zone such as saddles or carbon spheres or pellets or some other well-known tower packing material. While not acting as a catalyst, the surface of the packing does provide sites for contact between the gas and liquid and the reaction for conversion of hydrogen sulfide to sulfur.

At steady state operation of the process of this invention, the concentration of the thiosulfate ion in the solution is such that approximately half of the hydrogen sulfide in the gas stream reacts in accordance with the following formula:

$$2H_2S + 2H^+ + S_2O_3^= \rightleftarrows 4S + 3H_2O \qquad \text{I.}$$

to form sulfur leaving a gas stream lean in hydrogen sulfide to exit the first reaction zone and to enter the second reaction zone in the presence of a stoichiometric amount of oxygen sufficient to oxidize the remaining hydrogen sulfide, at steady state, almost half of that originally present, to the corresponding thiosulfate. This oxidation reaction causes the rest of the hydrogen sulfide to be removed and thus when exiting the second reaction zone the gas stream could be depleted or substantially free, of hydrogen sulfide, depending upon the gas stream requirements. For instance should the situation be a gas stream to be discharged to the atmosphere a 50 part per million hydrogen sulfide concentration can be tolerated and easily obtained. Of course, the gas stream would contain considerable water through the practice of this invention because contact with the gas stream occurs at an elevated temperature and therefore preferred operation is that a condenser and water knock-out drum be placed in the line for removal of the condensate stream.

The liquid solution now being enriched in thiosulfate ions exits the second reaction zone at a pH less than when it entered, usually at a pH at which it is desirable to reintroduce the regenerated thiosulfate stream into the first reaction zone to again contact the hydrogen sulfide in the gas stream, i.e. an initial pH of from 4.5 to 6.5.

The pH of the liquid solution is primarily controlled and adjusted by introducing an alkali metal hydroxide or ammonium hydroxide into said liquid solution prior to the contact with oxygen and the hydrogen sulfide lean gas stream prior to the second reaction zone. This pH is adjusted to a pH of from 5.0 to 7.0, preferably from 5.8 to 6.3, at the inlet of the second reaction zone. Thus, this becomes the initial pH of the thiosulfate lean solution prior to regeneration by contact with the gas stream lean in hydrogen sulfide. The reaction in the second reaction zone proceeds as follows:

$$2H_2S + 2O_2 \rightleftharpoons 2H^+ + S_2O_3^= + H_2O$$

The thiosulfate ion in the buffered aqueous solution would be present in the form of the ionized salt of either ammonium or sodium or potassium with sodium thiosulfate being preferred. The sodium thiosulfate is preferred because limited solubility of sodium sulfate, commonly called Glauber's salt, eases the separation in the purge stream.

The buffered liquid aqueous solution enters the first reaction zone at an initial pH of from 4.5 to 6.5 which, in the practice of the process of this invention, is the pH of the regenerated liquid aqueous solution recovered from the second reaction zone.

After contact and reaction with the hydrogen sulfide in the contaminated gas stream a thiosulfate lean liquid aqueous solution is removed from the first reaction zone at a higher pH, and the elemental sulfur, preferably in its molten state is separated. The thiosulfate lean stream is then contacted with an alkali metal hydroxide or ammonium hydroxide, usually the alkali hydroxide of the same salt of the thiosulfate being used, preferably ammonium hydroxide or sodium hydroxide to adjust the pH to the desired initial pH for introduction into the second reaction zone or regeneration zone, to contact the gas stream now including at least a stoichiometric amount of oxygen for the oxidation of hydrogen sulfide to the thiosulfate. The oxygen can be introduced in a gaseous mixture such as air when dilution of the contaminated gas stream is not important or as pure oxygen when the presence of the diluents, such as nitrogen in the case of air, are undesirable.

The liquid aqueous solution is buffered by employing the alkali metal carbonate, alkali metal acid phosphate, ammonium carbonate, or ammonium phosphate, as well known to those skilled in the art, to buffer the solution in the range of pH of 5.0 to 7.0. The acid phosphate buffering agent, such as sodium acid phosphate is preferred. The buffering agents are preferably added with the alkali hydroxide. When carbon dioxide is present in the gas stream some or all of the buffering may be accomplished by in-situ formation of carbonate buffering agents.

Turning now to the drawings, specifically FIG. 1, the gas stream contaminated with hydrogen sulfide entering through line 14 contacts the buffered aqueous solution enriched in thiosulfate ions at the selected pH of from about 4.5 to 6.5, preferably from 5.5 to 6.0 in a first reaction zone 10. The solution enters the reaction vessel 12 through line 16. The hydrogen sulfide containing gas stream remains in contact with the buffered aqueous solution enriched in thiosulfate ions in the first reaction zone for residence time sufficient to react a portion of the hydrogen sulfide to elemental sulfur. The residence time may be expressed in terms of time, usually expressed in seconds. In any case the gas and the solution should be in contact for from 15 seconds to 100 seconds. From this information, using conventional engineering parameters, a process engineer can calculate reactor size and bed dimensions.

Of course, in instances where there is a low loading of hydrogen sulfide in the gas stream and a high concentration of thiosulfate ion in the solution, all of the hydrogen sulfide may be reacted with thiosulfate ion to form elemental sulfur in the first reaction zone. This emphasizes one of the characteristics of the practice of the process of this invention. If all hydrogen sulfide is reacted in the first reaction zone, no hydrogen sulfide would be available for oxidation into thiosulfate ion in the second reaction, or oxidation, zone. Thus the buffered aqueous solution enriched in thiosulfate will continue to circulate and be reacted in the first reaction zone without any regeneration until there is hydrogen sulfide in the exit gas stream to be oxidized into thiosulfate ion. Thus the system equalizes itself.

Conversely, if there is a considerable hydrogen sulfide in the gas stream being treated in excess of the amount of thiosulfate needed, all of the thiosulfate ions will be reduced to elemental sulfur and a large amount of thiosulfate produced in the second reaction zone from the hydrogen sulfide leaving the first reaction zone 10 until the thiosulfate concentration is sufficient to convert about half of the hydrogen sulfide in the gas stream into elemental sulfur allowing the other half to exit the first reaction zone to be oxidized to thiosulfate. It is in this manner that the practice of the process of this invention becomes self-leveling and is able to tolerate wide and sudden shifts in hydrogen sulfide concentrations in the gas stream. Thus, it can be seen that the concentration of thiosulfate ions in solution is not critical since it balances itself against the amount of hydrogen sulfide in the gas at the pH operational ranges disclosed herein.

Returning to the drawing the first reaction zone 10 is preferably a packed bed reaction zone filled with solid packing material such as Berl saddles, Raschig rings, Intalox saddles or carbon pellets and the like to allow the contact surface and reaction time to be sufficient for the formation of elemental sulfur on the surface.

The first reaction zone 10 is operated preferably at a temperature wherein elemental sulfur is liquid or molten, i.e. between 270 degrees F. (130 C.) and 320 degrees F. (160 C.) preferably 300 degrees F. (150 C.) since it is within this range that molten sulfur has its lowest viscosity.

Since the reaction liquid is an aqueous material and the temperature is relatively high, often above the boiling point of water, it is preferable that the process be conducted at elevated pressures, even though such elevated pressures are not required for the reaction itself to proceed. In order to reduce water loss during the reaction taking place in the first and second reaction zones of this process elevated pressures are used in both reaction zones. Of course, the pressure is primarily dictated by the source of the gas stream contaminated with hydrogen sulfide and the ultimate disposition of the product gas depleted in hydrogen sulfide. If the product gas is to be placed into a pipeline being operated at elevated pressures then a compressor would be placed on the inlet side of the process of this invention such that the gas would be compressed in the first instance. This would materially reduce the amount of water consumed in the process and thus make it operate more efficiently. If the product gas is a flue gas to be vented to the atmosphere then some minimum pressure will be selected in order to optimize the operations giving consideration to pressure drop and water loss.

After reaction in the first reaction zone 10 the aqueous solution now lean in thiosulfate ions and containing elemental sulfur leaves the first reactor 12 through line 18 and into a sulfur separator 20 where the sulfur separates from the aqueous liquid lean in thiosulfate ions and is drawn from the sulfur separator 20 to storage through line 22. The liquid aqueous solution lean in thiosulfate ion is drawn from the sulfur separator 20 through line 24, through pump 26 and thence line 28 to the oxidation reactor vessel 30 containing the second reaction zone 32. Preferably, this reaction zone comprises two contact beds 32a and 32b which like the first reaction zone, may be packed with a ring or ceramic saddle packing or, preferably, solid carbon spheres. The buffered aqueous liquid solution now lean in thiosulfate ions passes through line 28 to the oxidation reactor vessel 30 where, just prior to entering the second reaction zone, the pH of such buffered liquid aqueous solution lean in thiosulfate ions is determined by sensor 34 which, in the preferred operating embodiment of this invention, is responsively connected to a valve which introduces a base such as an alkali metal hydroxide, preferably sodium hydroxide or ammonium hydroxide through line 36 to adjust the pH of the buffered liquid aqueous solution lean in thiosulfate ions such that the initial contact of the solution with the gas stream in the second reaction zone is at a pH of from 5.0 to 7.0 preferably from about 5.8 to 6.3

Returning to the reduction reactor 12 for a moment, the gas stream contaminated with hydrogen sulfide exits said reduction reactor 12 through line 38 as a stream lean in hydrogen sulfide. Prior to contacting the liquid solution in the second reaction zone 32 the gas stream lean in hydrogen sulfide is mixed with at least a stoichiometric amount of oxygen, either in the form of pure oxygen or a gas mixture such as air, sufficient to convert the hydrogen sulfide in the hydroxide sulfide lean gas stream to the thiosulfate ion in accordance with Equation II. The oxygen enters the gas stream through line 40 in response to the presence of hydrogen sulfide in the hydrogen sulfide depleted product gas stream. Should it be necessary, in order to remove the required amount of hydrogen sulfide in the product gas stream a supplemental stream of oxygen may optionally be injected into the oxidation reactor 30 through line 42 in between the beds 32a and 32b which form the second reaction zone.

The temperature and pressure maintained in the oxidation reactor 30 within the second reaction zone 32 are selected based upon the same considerations and criteria discussed hereinbefore with respect to the first reaction zone except that little, if any, elemental sulfur is produced. Since the oxidation of hydrogen sulfide is an exothermic reaction the temperature of the liquid solution exiting the second reaction zone 32 may be somewhat higher than the temperature entering such reaction zone.

The liquid aqueous solution, now rich in thiosulfate ions exits the oxidation reactor through line 44 pump 46 line 48 and through a heat exchanger, or heater 50, where the solution, enriched in thiosulfate ions, reenters line 16 for return to the reduction reactor 12 and the first reaction zone 10.

The heater 50 would normally be used only slightly during steady state operations but would be necessary to preheat the buffered aqueous liquid solution rich in thiosulfate ions during the start up of the process. Since the oxidation of hydrogen sulfide to the thiosulfate is an exothermic reaction it substantially replaces the heat lost in the reduction reaction which is an endothermic reaction and the loading on the heater 50 during the operation is small, if necessary at all depending upon heat losses and operating condition.

The gas stream, after traversing through the second reaction zone, is now depleted in hydrogen sulfide and exits the oxidation reactor 30 through line 52. If the product gas exiting through line 52 is to be vented to the atmosphere there probably would be little interest in attempting to recover the not insubstantial amounts of water vapor included in the gas stream. Should it be desirable to recycle such water vapor as shown on FIG. 1, the gas stream, depleted in hydrogen sulfide, would pass through condenser 54 and thence through line 56 to a water knock-out drum 58 where the condensed water separates from the product gas stream and exits the knock-out drum 58 through line 60, pump 62 and line 64 through which it is returned to the liquid aqueous solution lean in thiosulfate ions in line 28. The product gas would exit water knock-out drum 58 through line 66 where, if natural gas it would be returned to a natural gas pipeline. If the product gas is carbon dioxide for use in enhanced oil recovery then it would either go to a pipeline or storage or compressor for further processing. The quantity of hydrogen sulfide remaining in the depleted gas stream of course is dependent upon the requirements and specifications of the end use to which the product gas is to be put. It is a great advantage of the process of this invention that substantially all of the hydrogen sulfide can be removed from the gas stream if desired.

During the operation of the process of this invention a certain amount of thiosulfate is oxidized to the sulfate form. If the sodium thiosulfate is the source of the thiosulfate ion being used in the buffered liquid aqueous solution, Glauber's salt, sodium sulfate, is produced and should be purged from the system. In the flow diagram of FIG. 1 there is shown a solution purge stream 70 coming off of line 28 containing the liquid solution lean in thiosulfate ion. The purged stream proceeds through line 70 to a crystallizer 72 wherein the sulfate is precipitated and removed from the system through line 74. The liquor thus separated from the salt leaves crystallizer 72 and returns to line 28 through line 76.

Figure 2:
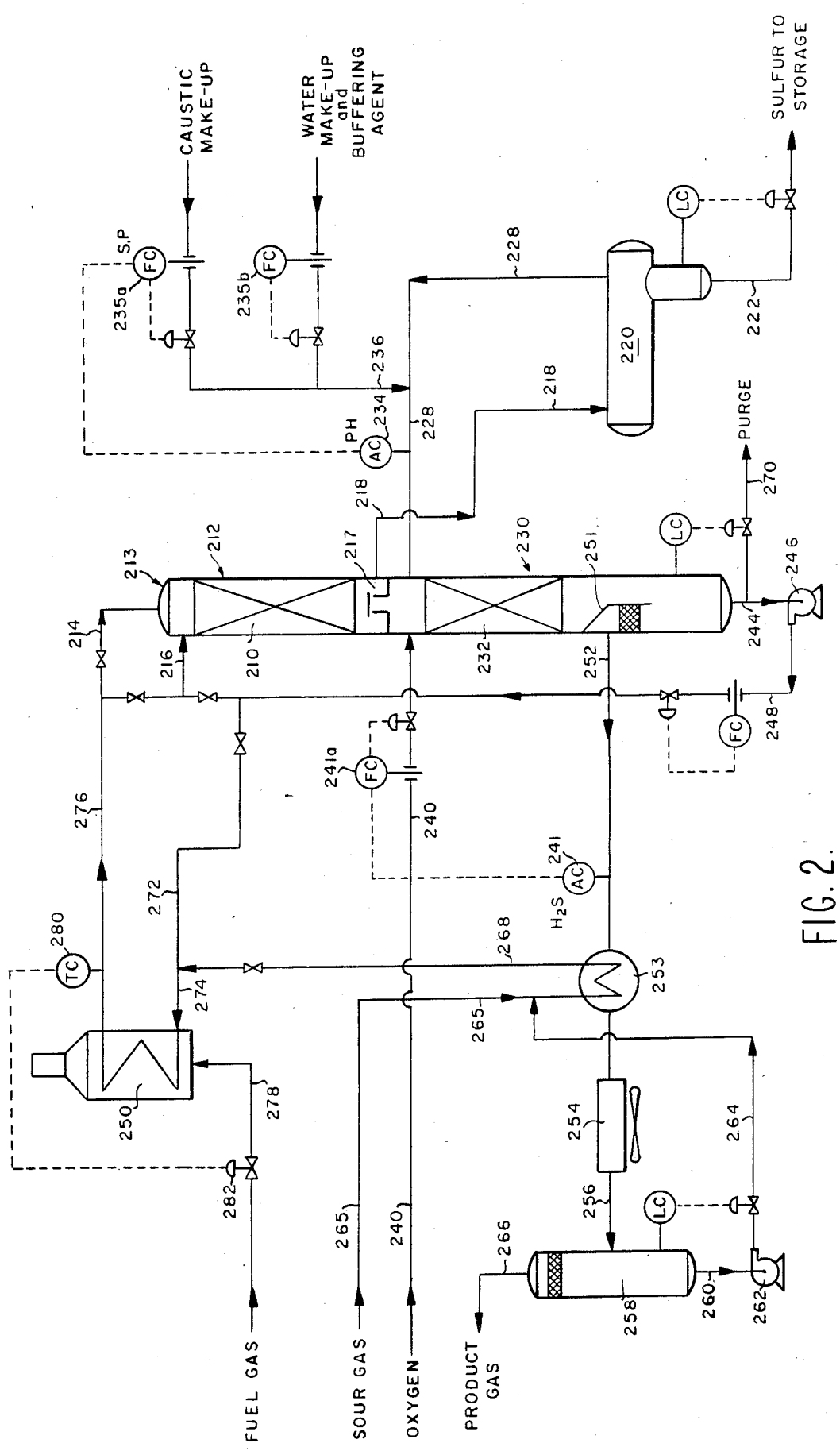
FIG. 2 shows a specific preferred embodiment of the process of this invention in diagrammatic form.

While the foregoing description is believed to be sufficient to enable one of ordinary skill in the art to practice the instant invention, for purposes of further description only a preferred embodiment of the instant invention wherein the oxidation and reduction reactor have been accorded is described with reference to FIG. 2.

In this particular embodiment a specific instance of the separation of carbon dioxide and hydrogen sulfide recovered as an acid gas from natural gas and therefore containing a small amount of methane is described. The flow sheet of such an embodiment is shown on FIG. 2. The gas stream is contaminated with 4% hydrogen sulfide and enters the first reaction zone 210 in the reduction reactor 212 being the upper portion of a single column 213 housing both reaction zones. The gas stream enters through line 214 where it contacts a buffered liquid aqueous solution rich in thiosulfate ions entering the first reaction zone 210 through line 216 having an initial pH of 5.6. Contact is made in the first reaction zone 210 at a temperature of 300 degrees F. and pressure of 490 psi (35 Kg/cm$^2$) where it proceeds downwardly through a packed carbon bed as the first reaction zone 210 to a draw-off tray 217 from which is drawn the liquid aqueous solution now lean in thiosulfate ions mixed with molten sulfur formed in the first reaction zone 210 through line 218 to a sulfur separator 220 wherein the sulfur and liquid solution lean in thiosulfate are separated with the sulfur being withdrawn from the bottom separator 220 through line 222 and the liquid aqueous solution lean in thiosulfate ion being withdrawn through line 228 through which it returns to the oxidation reactor section 230 of the unitary reaction vessel 213 and is introduced into the second reaction zone 232 which is also a packed bed where the gas/liquid contact is accomplished. The liquid aqueous stream lean in thiosulfate is at a temperature of about 295 degrees F. upon introduction into the second reaction zone 232.

Prior to the introduction of the liquid solution lean in thiosulfate into the second reaction zone 232 the pH is determined by a sensor 234 which operates a controller for a caustic make-up 235a and water make-up 235b which introduce a sufficient amount of caustic and water through line 236 into line 228 to adjust the pH of the liquid aqueous solution lean in thiosulfate to 6.3. It is introduced into the second reaction zone 232 at this initial pH to contact the liquid solution.

The gas stream exiting the first reaction zone 210 through the draw-off tray 217 is now lean in hydrogen sulfide though there still may be roughly one-half of the original hydrogen sulfide remaining in the gas stream which proceeds through the draw-off tray 217 to the second reaction zone 232 wherein it contacts the liquid solution lean in thiosulfate entering through line 228 and oxygen entering through line 240. The amount of oxygen introduced into the second reaction zone 232 through line 240 is at least the amount sufficient to oxidize the hydrogen sulfide remaining in the gas stream lean in hydrogen sulfide to the thiosulfate in the solution thus increasing the concentration of the thiosulfate ion in the solution and regenerating same for recirculation to the first reaction zone 210.

The needed amount of oxygen introduced through line 240 is determined by a sensor 241, which monitors the hydrogen sulfide content of the product gas, and a controller 241a which meters the oxygen entering through line 240 in response to a signal from the sensor 241. The liquid solution rich in thiosulfate ion exits the oxidation reactor section 230 through line 244 pump 246 and return line 248 for recycling to the reduction reactor 212 and the first reaction zone 210. The liquid solution enriched in thiosulfate ions exits the oxidation reactor 230 at a pH of about 5.8.

The purified product gas stream exits the oxidation reactor 230 through line 252 and gas outlet baffle 251. The product gas is at a temperature of 280 degrees F. (140 C.) and pressure of 300 p.s.i. (21 Kg/cm$^2$) and passes through a heat exchanger 253 where some heat is removed through indirect heat exchange to heat the entering gas stream contaminated with hydrogen sulfide. The product gas then proceeds further to a condenser 254 where water in the product gas is further condensed thence through line 256 into a water knock-out drum 258 where the water is removed through line 260 pump 262 and line 264 which returns the water to the inlet gas stream which enters heat exchanger 253 through line 265 and proceeds through line 268 to heater 250 which is used mainly for start-up of the unit and to add such heat as may be necessary to increase the temperature of the sour gas stream being treated to the inlet conditions of the reduction reactor section 212.

During start-up the liquid solution rich in thiosulfate ion is withdrawn from line 248 through line 272 where it is joined by the sour gas stream entering through line 268 and proceeds thence through line 274 into the heater 250 and from said heater through line 276 where line 214 is joined for introduction of the mixed streams to the reactor vessel 213. The heater 250 receives fuel gas through line 278 and its operation is controlled by sensor 280 which measures the temperature of the stream in line 276 and responsive to such sensor 280 a control valve 282 limits the amount of fuel gas entering the heater 250. As in the previously discussed embodiment of the instant invention, a purge stream is removed from the liquid solution rich in thiosulfate to remove the sulfates formed in the reaction through line 270. In this embodiment the product gas, containing only 50 parts per million hydrogen sulfide, exits the water knock-out drum 258 through line 266. Having thus described the foregoing invention those of ordinary skill in the art will readily perceive many variations and modifications thereof which remain within the scope and the spirit of such description and appended claims.

We claim:

1. A method for recovering elemental sulfur and selectively removing hydrogen sulfide from a hydrogen sulfide containing sour gas stream also containing carbon dioxide which comprises:
    (a) contacting the hydrogen sulfide containing sour gas stream in a first reaction zone with a buffered aqueous solution enriched in thiosulfate ions at a pH between 4.5 and 6.5 for a residence time sufficient to react a portion of the hydrogen sulfide to elemental sulfur and thereby produce a single gas stream lean in hydrogen sulfide and a separate aqueous solution lean in thiosulfate ions, said aqueous solution containing elemental sulfur;
    (b) separating the elemental sulfur from the aqueous solution lean in thiosulfate ions;
    (c) contacting the single gas stream lean in hydrogen sulfide from the first reaction zone with an oxygen-containing gas and the aqueous solution lean in thiosulfate ions in a second reaction zone at an initial acid to neutral pH greater than the pH in the first reaction zone for a residence time sufficient to enrich the thiosulfate ion concentration of the aqueous solution and to produce a hydrogen sulfide depleted product gas stream;
    (d) removing the hydrogen sulfide depleted product gas stream from the second reaction zone; and
    (e) recycling the aqueous solution enriched in thiosulfate ions without change in composition to the first reaction zone.

2. The method of claim 1 wherein the initial pH of the aqueous solution in the second reaction zone is between 5.0 and 7.0.

3. The method of either claim 1 or claim 2 wherein the single gas stream lean in hydrogen sulfide is contacted in the second reaction zone with at least the stoichiometric amount of oxygen necessary to oxidize all of the hydrogen sulfide therein to the thiosulfate form.

4. The method of either claim 1 or claim 2 wherein the first reaction zone is maintained at a temperature between 130 degrees C. and 160 degrees C.

5. The method of either claim 1 or claim 2 wherein the pH of the buffered aqueous solution enriched in thiosulfate ions is controlled by addition of an alkali metal hydroxide to the solution lean in thiosulfate.

6. The method of either claim 1 or claim 2 wherein the thiosulfate solution is buffered by addition of a buffering agent selected from the group consisting of an alkali metal carbonate, alkali metal acid phosphate, ammonium carbonate, and ammonium phosphate.

7. The method of either claim 1 or claim 2 wherein contact of the gas stream with the buffered aqueous solution occurs in the first and second reaction zones in co-current flow.

8. The method of either claim 1 or claim 2 wherein the first and second reaction zones are beds of solid packing material.

9. The method of claim 8 wherein the solid packing material is ceramic saddles or carbon pellets.

10. The method of claim 5 wherein a purge stream is recovered from the thiosulfate solution, a major portion of alkali metal sulfate is separated from the purge stream and the resulting stream lean in alkali metal sulfate is returned to the thiosulfate solution.

* * * * *